INVENTOR
Henry J. Zwald
BY
Robert E. Strausser
ATTORNEY

June 25, 1963 H. J. ZWALD 3,094,887

SECURING APPARATUS

Filed March 9, 1960 3 Sheets-Sheet 2

INVENTOR
Henry J. Zwald

BY

Robert C. Strausser
ATTORNEY

June 25, 1963 H. J. ZWALD 3,094,887

SECURING APPARATUS

Filed March 9, 1960 3 Sheets-Sheet 3

INVENTOR
Henry J. Zwald
BY
Robert E. Strausser
ATTORNEY 3,094,887

SECURING APPARATUS

Henry J. Zwald, Seneca Falls, N.Y., assignor to Sylvania Electric Products Inc., a corporation of Delaware Filed Mar. 9, 1960, Ser. No. 13,928
2 Claims. (Cl. 78—1)

This invention relates to securing apparatus and more particularly to an apparatus for securing eyelets and the like to the leads of a stem used in the fabrication of electron discharge devices.

Stems used in electron discharge devices such as cathode ray tubes generally comprise a glass wafer having conductive leads molded therein. Eyelets are used as shields to prevent the deposition of conductive materials and therefore prevent electrical leakage on the wafer surface between the leads during tube processing and subsequent use. These materials come from various sources in the tube such as the cathode and getter.

Heretofore, shield eyelets have been manually positioned and secured, individually, on each lead. Since it is not uncommon for a stem to have five or more leads requiring a shield, it can be seen that a considerable amount of time was required for this operation. Accordingly, it is one object of this invention to increase the rate at which eyelets are applied. It is another object of this invention to secure a plurality of eyelets to a stem simultaneously.

A considerable amount of skill was required to position the eyelets on the leads at the same distance above the wafer surface and in proper alignment with the lead axis. Therefore, it is another object of this invention to increase the uniformity of eyelet placement and alignment with the lead to which the eyelet is secured. It is yet another object of this invention to provide a simplified apparatus which can be operated by an individual having minimal experience and training.

Welding, which had been used to secure the eyelets to the leads prior to this invention, often resulted in the forming of a flash or burr at the weld. As these burrs had sharp points, they often caused discharge problems at the high voltages employed in certain cathode ray tubes. Further, it was not uncommon for the welding current to occasionally burn through the lead or shield which resulted in the rejection of the stem. Also, it was almost impossible to obtain a uniform weld strength so that some of the eyelets were less secure than others and could loosen when the completed device was subjected to vibration. The heat produced by the welding operation occasionally caused the glass bead, formed at the junction of the lead and wafer, to crack or chip. Imperfections of this nature were a cause for rejection. Therefore, it is an object of this invention to produce a joint between an eyelet and lead with a minimum amount of burring. It is still a further object of this invention to obviate the possible severance of leads during the securing operation. It is yet another object of this invention to decrease the rejections due to cracked glass occasioned by the securing operation.

The above and other objects and advantages are achieved in one aspect of the invention by simultaneously aligning all the eyelets to be applied to a stem, inserting the stem leads into the eyelets so that the eyelets assume their proper position relative to the wafer, and simultaneously securing all the eyelets to the inserted leads by swaging.

For a better understanding of the invention reference is made to the following description taken in conjunction with the accompanying drawings in which.

Figures 1, 5:
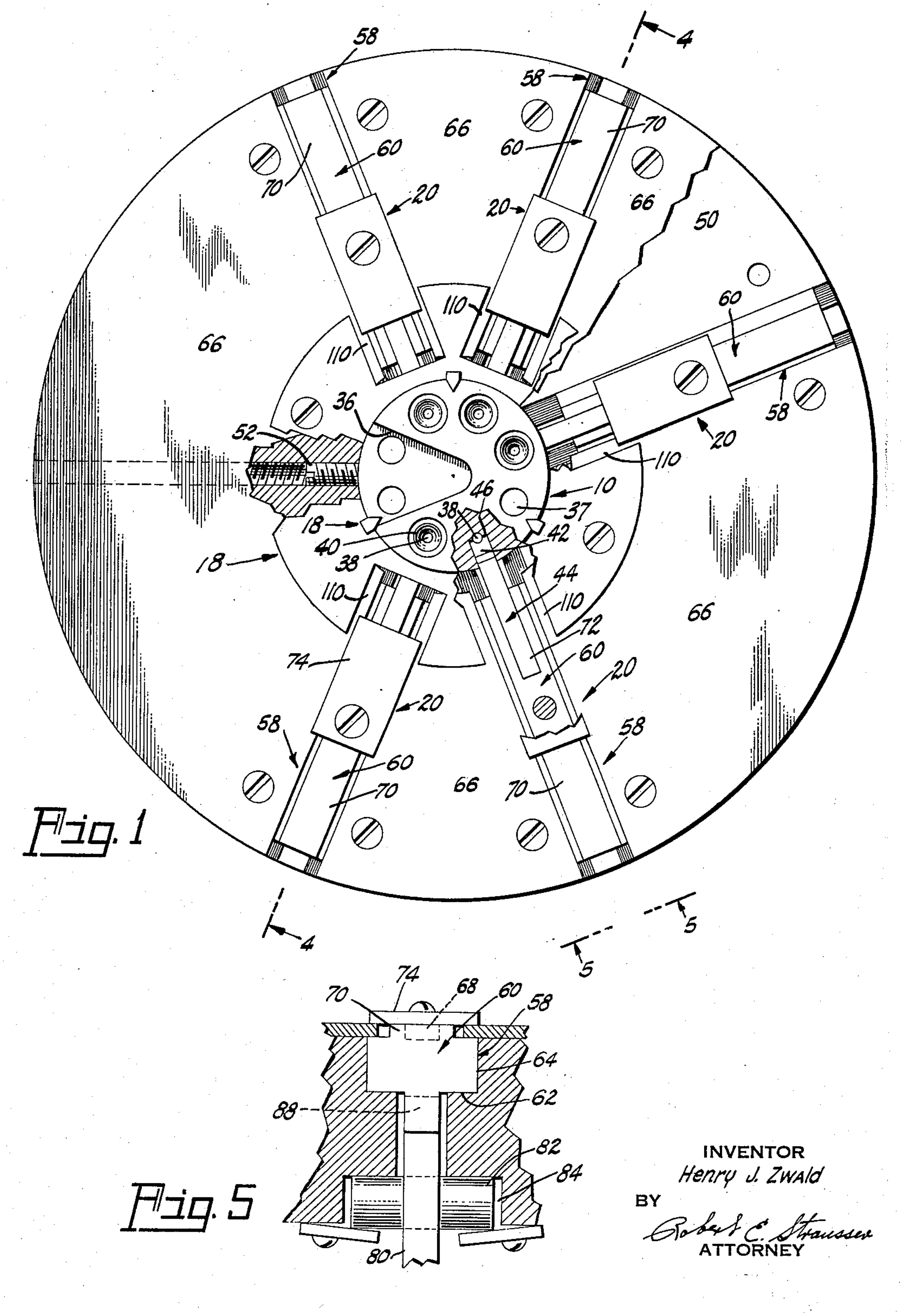
FIG. 1 is a plan view of the swaging or securing apparatus.
FIG. 5 is an end view with some parts broken away and other parts omitted in the interests of clarity taken along the line 5—5 of FIG. 1.
Figure 6:
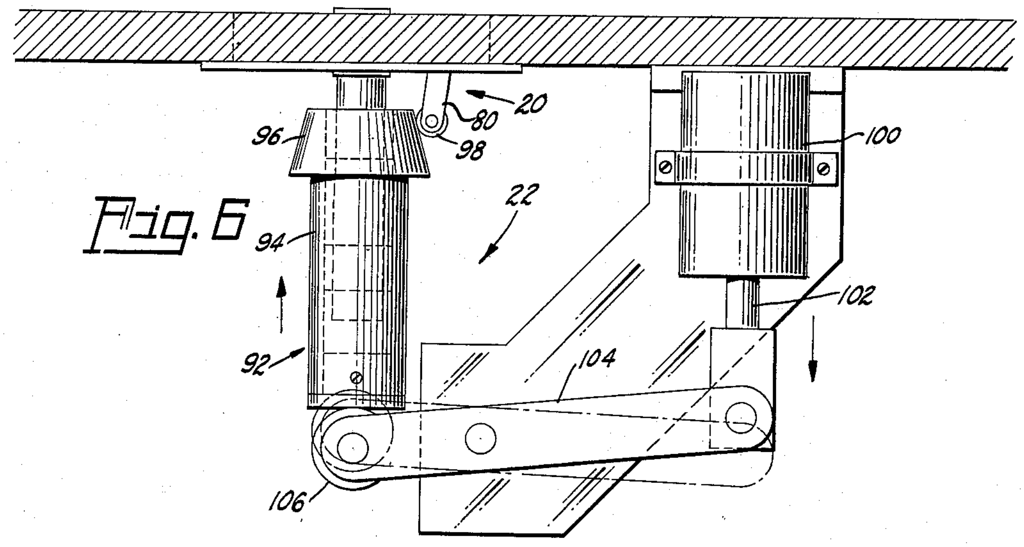
FIG. 6 is an elevation of a portion of the apparatus.

Referring to the drawings, the embodiment of the invention illustrated comprises locating means 10 for simultaneously positioning a plurality of eyelets 12 in a selected arrangement corresponding to the pattern of the leads 14 of a stem 16 to which eyelets are to be attached. There is also provided spacer means 18 for predetermining the distance which the leads pass through the eyelets; swaging means 20, operable simultaneously for securing the eyelets to the leads; and power means 22 for operating the swaging means.

Figure 2:
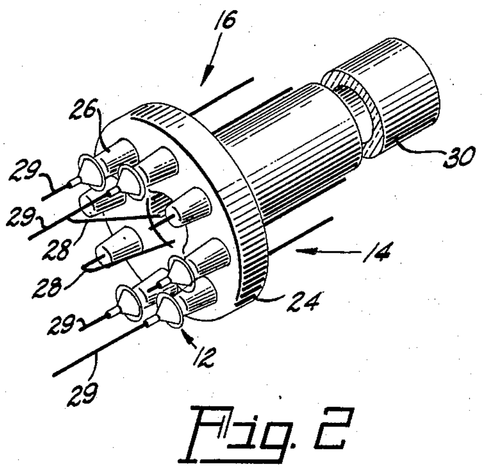
FIG. 2 is an enlarged perspective view of a stem having a plurality of eyelets secured thereto.

A typical stem 16, as used in a cathode ray tube for supporting an electron gun, is illustrated in FIG. 2. The leads 14 are molded in the glass wafer 24. Raised portions or beads 26 formed on the wafer encompass the leads for a short distance beyond the wafer surface. The beads 26 increase the lead to lead distance as measured across the glass surface. The leads 14 are used for various purposes in the tube and therefore certain of their number are especially formed as bent leads 28 while others, such as straight leads 29, remain axially aligned and parallel to the longitudinal axis of the stem. Tubulation 30, centrally connected to the wafer 24, is used to exhaust the cathode ray tube envelope after the completed stem, with an electron gun mounted thereon, has been joined to the envelope.

Figure 3:
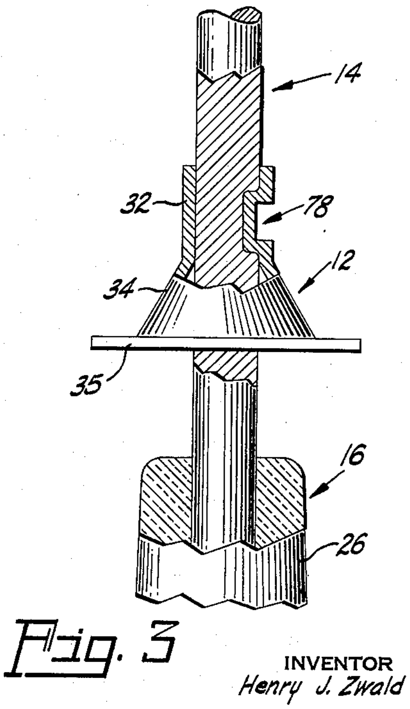
FIG. 3 is a greatly enlarged view in partial section of a stem lead with an eyelet secured thereto.

Each eyelet 12, as illustrated in FIGS. 2 and 3 has a tubular portion 32, a conical segment 34, and a flange 35. The eyelets are joined to the leads 14 with their flanges 35 at a particular distance from the beads 26. The distance between the flange and the bead determines the shielding effect of the eyelet on the bead.

The eyelet aligning means 10 includes a multiple swaging die which is provided with a plurality of longitudinally extending passageways. The spacing and pattern of the passageways corresponds to the arrangement of lead positions on the stem 16. A niche 36 in the die surface is provided for the formed leads 28. Axially aligned leads to which eyelets will not be attached are accepted in noncontoured passageways 37. Internal walls of certain of the passageways 38, corresponding in number and location to the leads to which eyelets are to be secured, define eyelet receiving recesses 40 adjacent the upper surface of the die 10. The contour of recess 40 complements the outer configuration of the eyelet 12. A portion of the outer wall of the die 10 is removed adjacent each contoured passageway 38 to form an aperture 42 through which the swaging tool 44 may enter the recess 40. The width of the swaging tool 44 is equal to the width of the aperture 42 which is in turn wider than the diameter of the recess 40. The back wall 46 of the aperture 42 lies substantially on the diameter of the recess 40. The distance the swaging tool 44 can enter the recess 40 is thusly limited by the back wall 46 of the aperture (see FIG. 1); this construction prevents the end of the tool 44 from passing more than half way through the recess 40 during the swaging operation. The position limitation prevents the severance of the leads or eyelets.

Vertical shaft 48, whose purpose will be explained later, is secured to the die in alignment with the longitudinal axis of the die 10. Swaging die 10 is affixed to a slideway plate 50 by a screw 52 (FIG. 1), which is attached to platform 54 by member 56.

Figure 4:
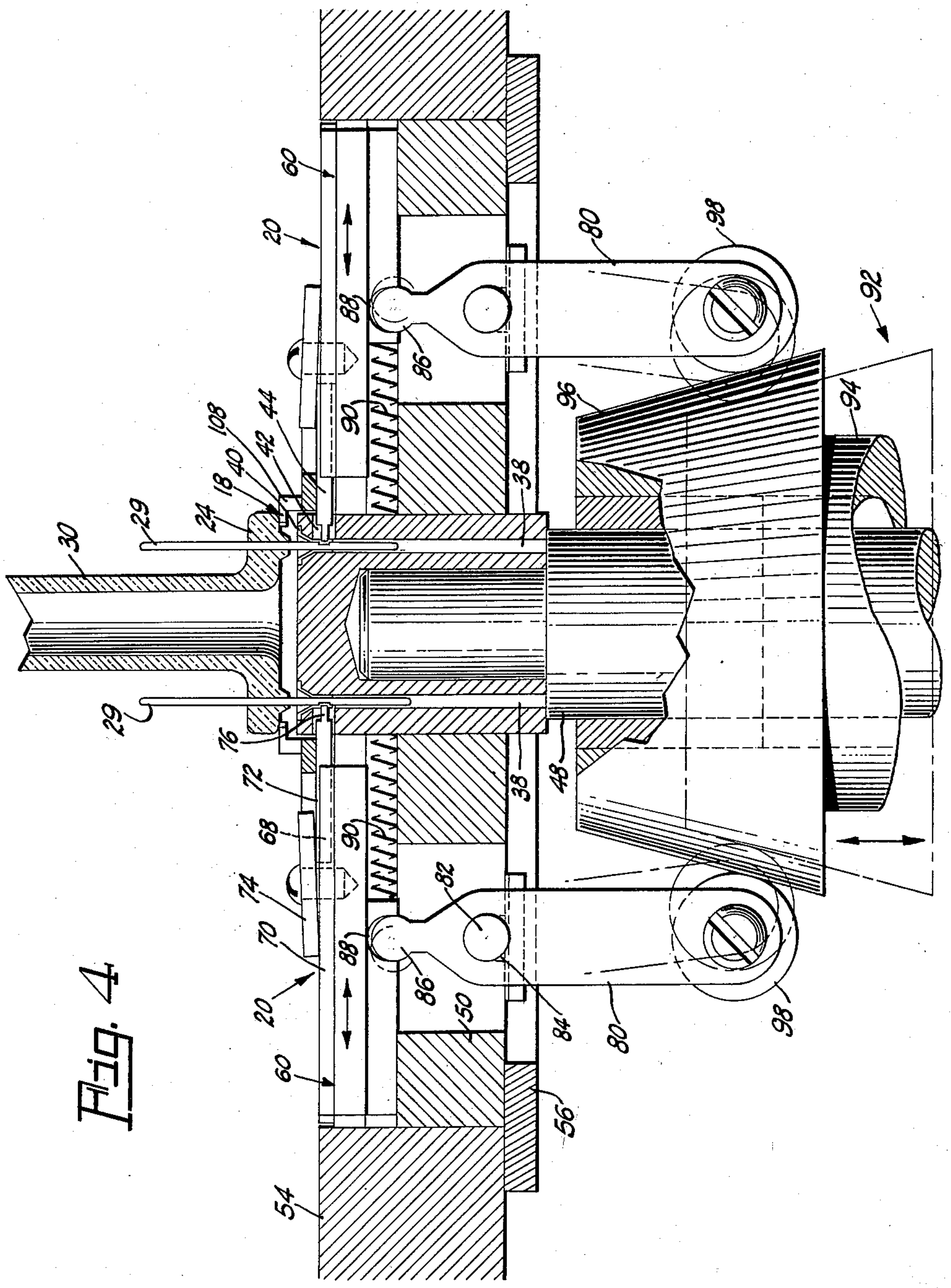
FIG. 4 is a cross sectional view of the apparatus taken along the line 4—4 of FIG. 1.

Referring to FIGS. 1, 4 and 5, slideway plate 50 is formed to provide a plurality of slideways 58 each of which is disposed along a projected radius of the swaging die 10 in alignment with a tool receiving aperture 42. A tool slide 60, reciprocatably mounted in each of the slideways 58, slides on ledges 62 formed in the slideway wall 64. Vertical escape of the slide 60 from the slideway is prevented by a sectional cover plate 66 which extends inwardly over the slideway. Each of the cover plate 66 sections is secured to the slideway plate 50.

Slide 60 has a tool receiving recess 68 formed in a boss 70 on its upper surface. Swaging tool shank 72 is held in the recess 68 by a screw operated clamp 74. The free or operative end 76 of the swager 44 is shaped to provide the desired swaged configuration. The tool illustrated in FIG. 4 will produce the swage type shown at 78 in FIG. 3 as previously explained. Inward movement of the tool 44 is limited by the rear wall 46 of the aperture 42. The depth of swage 78 may be adjusted by controlling the forward movement of the tool carrying slide. Tool carrying slide 60 is moved toward the swaging die 10 by the action of lever arm 80 pivoted about pin 82 carried in recess 84 which is transverse to the slideway 58. Slide contacting end 86 of lever 80 is ball shaped and rides in a socket 88 formed in the underside of the slide 60. Slide 60 is urged away from the die 10 by return spring 90. Pivotal movement of lever arm 80 is produced by the reciprocation of swaging operator 92. Operator 92 comprises tubular member 94, slidably mounted upon shaft 48, and a frustro-conical cam 96 contacts the eccentrically mounted rollers 98 secured to the levers 80. Eccentric mounting of roller 98 on the lever allows the throw or movement of the individual swaging tool slide 60, driven by that lever, to be adjusted by changing the distance between the center of the roller and the centerline of the lever. In this manner proper swaging can be assured in each of the individual swaging operations. The slide return springs 90 help to keep the rollers 98 in contact with the cam 96.

Operator 92 is reciprocated by fluid motor 100 when it is energized by the control means, not shown. Ram 102 of the motor is connected to pivotally mounted lever arm 104 and when it is moved roller 106, carried by the arm, contacts the end of the operator 92 and lifts it up. The upward movement drives the cam 96 against the rollers 98 thus moving the tools 44 into the eyelet recesses to perform the swaging operation.

The location of the eyelets on the leads is determined by the distance the leads pass or penetrate through the eyelets. Depth of penetration is controlled by spacer means 18. Arms 108, which contact the wafer 24, as illustrated in FIG. 4, limit the movement of the stem toward the swaging die 10. Cutouts 110 provide clearance for the tool clamp 74. This spacing arrangement is positive in that the depth of eyelet penetration or, inversely, the distance of the eyelet flange 35 above the wafer surface, is controllable within close limits and is readily reproducible. A change in spacings is accomplished by replacing the spacer 18 with one having arms 108 of the desired length or height.

Reference will now be made to a typical cycle of operation of the present apparatus, to facilitate a more thorough understanding of the invention. A plurality of eyelets 12 are delivered to the swaging die 10 by means not shown. They may be deposited individually, manually or by automatic means. Such automatic means are disclosed in my co-pending application filed concurrently herewith entitled "Feeder Mechanism," now Patent No. 3,051,354, which is assigned to the same assignee as the present invention. The eyelets are each deposited in the appropriate recess 40 with their tubular portions lowermost. When the eyelets have been delivered to the die, a stem 16 is positioned above the die 10 with its leads 29 aligned with the passageways in the die, and is then lowered into contact with the spacer means 18. The leads to which eyelets are to be attached pass through the eyelets held in the die. The depth of penetration of the leads 29 is determined by the spacer means 18. Movement of the wafer 24 toward the die is arrested by spacer arms 108.

After the leads and eyelets have been assembled the fluid motor 100 is energized by the control means, not shown. Energization of fluid motor 100 causes ram 102 to pivot lever 104 forcing lower roller 106 to lift the swaging operator 92. Swaging operator 92 is free to move on shaft 48. Swager cam 96 contacts the rollers 98 carried by lever arm 80 and, as the movement of the cam continues, causes lever 80 to pivot about pin 82. Movement of ball member 86, rotatably held in socket 88 formed in tool carrying slide 60, causes the slide 60 to advance in the slideway 58 toward the central die 10 against the force of spring 90. Free end 76 of swaging tool 44 enters swaging die 10 through tool aperture 42. The formed end 76 of tool 44 is applied to the eyelet and lead combination with sufficient force to create a permanent distortion or swage joint as shown in FIG. 3. The lead and eyelet are retained in position by recess 40. The lead 29 cannot bend because of the close fit between the lead, eyelet, and the walls of the passageway. When the desired swage 78 has been formed, cam 96 is stopped. Control means, not shown, then reverses fluid motor 100 lowering operator 92 and allowing the slides 60 to be returned to their position by the springs 90. The return springs 90 keep the rollers 98 in contact with the cam 96 so that the movement of the swaging slides 60 is under control at all times. Mounting the individual rollers 98 eccentrically permits adjustment of slide movement, by controlling the movement of the lever arms, so that the swaging operations are synchronized. This arrangement results in a multiple swaging operation performed at high speed under closely controlled conditions.

After the swaging tools are retracted, the eyeleted stem may be removed from the apparatus which is then in condition for the next swaging operation. The swage contour illustrated in the drawings allows a group of eyelets, fabricated from metal, such as nickel, having a wall thickness of .005", to be simultaneously joined to .035" diameter leads with minimal force. The positive tool stop provided by the wall 46 of the tool aperture 42 prevents a swage depth of over 50% of the total thickness of the lead and eyelet. Swages of this depth are extremely secure while the lead is not appreciably weakened. The basic apparatus is adaptable, in many respects, so that various eyelet sizes, configurations, lead sizes, and patterns may be processed.

Although one embodiment of this invention has been shown and described, it will be apparent to those skilled in the art that various changes and modifications may be made therein without departing from the scope of the invention.

What is claimed is:

1. In an apparatus for securing eyelets to a stem having a plurality of leads arranged thereon in a particular pattern, said eyelets having a configuration of a conical segment connected to a tubular portion, each of the combination comprising a multiple swaging die, said die provided with a plurality of longitudinally extending passageways, selected ones of said passageways being provided with an eyelet receiving recess adjacent the upper surface of said die, said recess comprising a cylindrical portion terminating in an upper conical flaring portion of a size and shape to conform with that of said eyelet to firmly seat said eyelets completely within the die, tool receiving apertures formed in said multiple swaging die transverse to the longitudinal axis of said longitudinal passageways contiguous with said eyelet receiving recesses and spaced from said upper surface a distance exceeding said eyelet conical segment; a plurality of tool carrying slides; a swaging tool carried by each of said slides; and means associated with said tool carrying slides for reciprocating said slides to and from said multiple swaging die whereby said tools enter said tool apertures to perform said swaging operation on the tubular portion of said eyelets, the cylindrical and conical flaring portion of the die enabling an eyelet to be fastened to the lead without malformation of said conical portion.

2. In a swaging apparatus for joining eyelets to the leads of a stem the combination comprising a circular plate formed to provide a central aperture and a plurality of radial slideways, each of said slideways terminating at said central aperture; a cylindrical multiple swaging die having a top surface and sidewall, said die mounted in said central aperture with the top surface of said die adjacent the top surface of said plate, said die formed to provide a plurality of radially spaced longitudinally extending passageways therethrough, selected ones of said passageways corresponding in number and position with said slideways, the internal wall of each of said selected passageways defining an eyelet receiving recess adjacent said top surface of said die for holding said eyelets completely therewithin, said die sidewall formed to provide radially extending tool receiving apertures spaced from said die top surface transverse to the longitudinal axis of said passageways and extending partially therethrough; a slide mounted for reciprocating movement in each of said slideways; a return spring between each of said slides and said die; a tool holder carried by said slides; swaging tools mounted in said tool holders and adapted to be entered into said tool receiving apertures; a plurality of lever arms pivoted on said plate, one end of each of said lever arms engaging one of said slides, a roller eccentrically mounted on the other end of each o fsaid lever arms whereby the distance between the center of said roller and the center line of said arm may be varied to adjust the movement of said lever arm; a common swaging operator mounted for reciprocating movement in a direction normal to the direction of movement of said slides, said operator having a frustroconically shaped roller contacting cam; means for reciprocating said operator whereby said cam contacts said rollers pivoting said lever arms and said slides are simultaneously moved to cause said swaging tools to enter said selected passageways in said die and means for limiting the penetration of said swaging tools into said tool receiving apertures.

References Cited in the file of this patent

UNITED STATES PATENTS

| | | |
|---|---|---|
| 2,478,231 | Bowers | Aug. 9, 1949 |
| 2,694,433 | Fulton | Nov. 16, 1954 |
| 2,783,813 | Duks | Mar. 5, 1957 |
| 2,838,789 | Pazandak | June 17, 1958 |
| 2,929,433 | Andren | Mar. 22, 1960 |
| 2,959,076 | Novak | Nov. 8, 1960 |